United States Patent
Tamura (10) Patent No.: US 10,604,012 B2
(45) Date of Patent: Mar. 31, 2020

(54) DISPLAY CONTROL DEVICE, DISPLAY SYSTEM, AND DISPLAY CONTROL METHOD

(71) Applicant: ALPINE ELECTRONICS, INC., Shinagawa-ku, Tokyo (JP)

(72) Inventor: Wararu Tamura, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 298 days.

(21) Appl. No.: 15/850,437

(22) Filed: Dec. 21, 2017

(65) Prior Publication Data

US 2018/0244154 A1 Aug. 30, 2018

(30) Foreign Application Priority Data

Feb. 27, 2017 (JP) ................... 2017-034982

(51) Int. Cl.
*B60K 35/00* (2006.01)
*G06T 3/60* (2006.01)
*G06F 3/14* (2006.01)
*G09G 5/12* (2006.01)

(52) U.S. Cl.
CPC ............... *B60K 35/00* (2013.01); *G06F 3/14* (2013.01); *G06T 3/60* (2013.01); *G09G 5/12* (2013.01); *B60K 2370/152* (2019.05); *B60K 2370/154* (2019.05); *B60K 2370/16* (2019.05); *B60K 2370/52* (2019.05); *G09G 2320/0261* (2013.01); *G09G 2380/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,277,123 | B2 * | 3/2016 | Williams | H04N 5/23245 |
| 9,426,409 | B2 * | 8/2016 | Beysserie | H04N 5/91 |
| 9,554,058 | B2 * | 1/2017 | Kim | H04N 5/2355 |
| 9,609,199 | B2 * | 3/2017 | Nakata | H04N 5/2353 |
| 9,736,425 | B2 * | 8/2017 | Gu | H04N 5/2329 |
| 9,992,443 | B2 * | 6/2018 | Titi | H04N 5/7605 |
| 10,070,067 | B2 * | 9/2018 | Jo | H04N 5/2352 |
| 10,110,827 | B2 * | 10/2018 | Mitsunaga | H04N 5/3535 |
| 10,158,797 | B2 * | 12/2018 | Baghert | H04N 5/23219 |
| 10,319,079 | B2 * | 6/2019 | Sohoni | G06T 5/50 |
| 10,440,287 | B2 * | 10/2019 | Jeong | H04N 5/35581 |

(Continued)

FOREIGN PATENT DOCUMENTS

| | | | | |
|---|---|---|---|---|
| JP | WO 2012107952 | * | 3/2014 | G06T 11/203 |
| WO | WO2012-107952 | | 8/2012 | |

*Primary Examiner* — Redhwan K Mawari
(74) *Attorney, Agent, or Firm* — Brinks Gilson & Lione (57) ABSTRACT

A display control device is connected to a display device, and the display control device includes a storage unit to store moving object information which is acquired on a first cycle in correlation with time information. A generation unit reads the moving object information stored in the storage unit and generates image data. The image data generated by the generation unit is displayed on a second cycle which is longer than the first cycle. The generation unit calculates the moving object information corresponding to a generation start time of the N-th generated image data on the basis of the moving object information which is stored in the storage unit at times before and after the generation start time and generates the (N+1)-th image data.

7 Claims, 10 Drawing Sheets

(56) References Cited

U.S. PATENT DOCUMENTS

| | | | | |
|---|---|---|---|---|
| 2010/0127958 A1* | 5/2010 | Masuda | ................. | B60K 37/02 |
| | | | | 345/84 |
| 2015/0312463 A1* | 10/2015 | Gupta | ................. | H04N 5/2352 |
| | | | | 348/239 |
| 2018/0244154 A1* | 8/2018 | Tamura | .................... | G09G 5/12 |

* cited by examiner

DISPLAY CONTROL DEVICE, DISPLAY SYSTEM, AND DISPLAY CONTROL METHOD

RELATED APPLICATION

The present application claims priority to Japanese Patent Application Number 2017-034982, filed Feb. 27, 2017, the entirety of which is hereby incorporated by reference.

BACKGROUND

1. Field of the Invention

The present invention relates to a display control device, a display system, and a display control method.

2. Description of the Related Art

In the related art, mounting a display control device in various moving objects such as vehicles and graphically displaying various meters indicating moving object information is known. In graphically displaying meters, it is necessary to cause a needle to move smoothly, for example, even in a meter in which the needle moves fast such as a speedometer, so that an uncomfortable feeling is not given to a user. On the other hand, an acquisition cycle of moving object information and a display update cycle of a meter are not generally synchronized with each other, and a so-called phenomenon that a motion of a needle fluctuates may occur in which a degree of motion of the needle of the meter is not constant even when a change of information is constant.

In WO 2012/107952 A, a configuration is proposed which reduces a phenomenon that the motion of the needle fluctuates by estimating information at display times by linear interpolation.

However, the system in WO 2012/107952 A is based on the premise that the acquisition cycle of information is longer than the display update cycle of the meter, and the linear interpolation cannot be performed when the display update cycle of the meter is longer than the acquisition cycle of information. The system in WO 2012/107952 A is also based on the premise that a processing load of the display control device is constant, and it is difficult to reduce the phenomenon that the motion of the needle fluctuates when the processing load of the display control device varies.

SUMMARY

The present disclosure is made in consideration of the above-mentioned circumstances and an object thereof is to realize a smooth motion in graphically displaying moving object information.

According to one aspect, a display control device is connected to a display device, and the display control device includes:

a storage unit configured to store moving object information which is acquired on a first cycle in correlation with time information;

a generation unit configured to read the moving object information stored in the storage unit and to generate image data; and a control unit configured to perform control such that the image data generated by the generation unit is displayed on a second cycle which is longer than the first cycle, wherein the generation unit calculates the moving object information corresponding to a generation start time of the N-th generated image data on the basis of the moving object information which is stored in the storage unit at times before and after the generation start time and generates the (N+1)-th image data. Therefore, it is possible to realize a smooth motion in graphically displaying moving object information.

DETAILED DESCRIPTION

Hereinafter, embodiments will be described with reference to the accompanying drawings. In the specification and the drawings, elements having substantially the same functional configurations will be referenced by the same reference numerals and description thereof will not be repeated.

[First Embodiment]

<System Configuration of Display System>

First, a system configuration of a display system 100 according to a first embodiment will be described below. In this embodiment, it is assumed that the display system 100 is mounted in a vehicle. The mounting location of the display system 100 is not limited to a vehicle, but may be mounted in various moving objects other than a vehicle.

Figure 1:
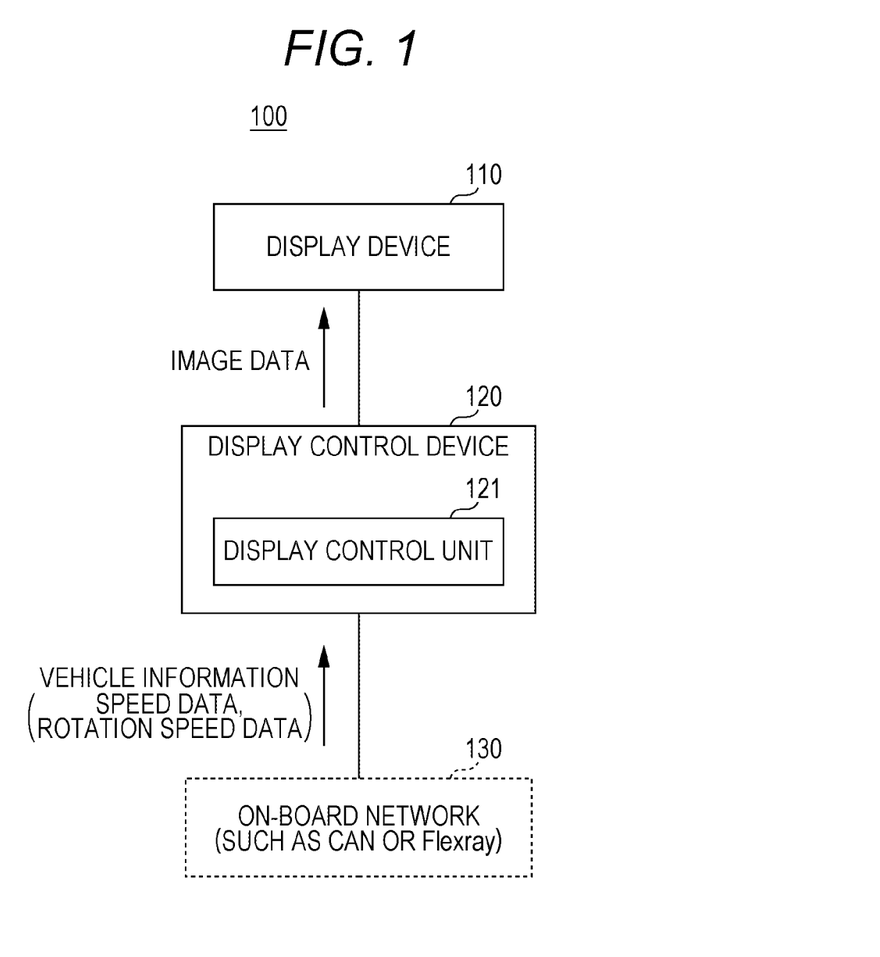
FIG. 1 is a diagram illustrating an example of a system configuration of a display system.

FIG. 1 is a diagram illustrating an example of a system configuration of the display system. As illustrated in FIG. 1, the display system 100 includes a display device 110 and a display control device 120.

The display device 110 is, for example, an instrument panel of a vehicle and sequentially receives image data (image data including a speed meter or a rotation speed meter) which is generated by the display control device 120. The display device 110 displays the image data sequentially received from the display control device 120 on a predetermined display cycle (for example, 16 [msec] (60 [Hz])).

The display control device 120 is constituted, for example, by an electronic control unit (ECU). A display control program is installed in the display control device 120, and the display control device 120 functions as a display control unit 121 by executing the program. The display control unit 121 acquires vehicle information from an on-board network 130 on a predetermined acquisition cycle (for example, 10 [msec]), and generates image data which is displayed on the display device 110. The vehicle information refers to arbitrary information of the vehicle. In this embodiment, it is assumed that the display control unit 121 acquires speed data and rotation speed data from the on-board network 130 as the vehicle information. The vehicle information which is acquired by the display control unit 121 is not limited thereto and other vehicle information may be acquired.

The on-board network 130 is a network mounted in the vehicle and performs communication based on standards such as controller area network (CAN) and Flexray. In this embodiment, it is assumed that the display control device 120 acquires the vehicle information through connection to the on-board network 130. Here, the display control device 120 may be configured to acquire the vehicle information through connection to a network or a device other than the on-board network 130.

<Display Example of Display Device>

Figure 2:
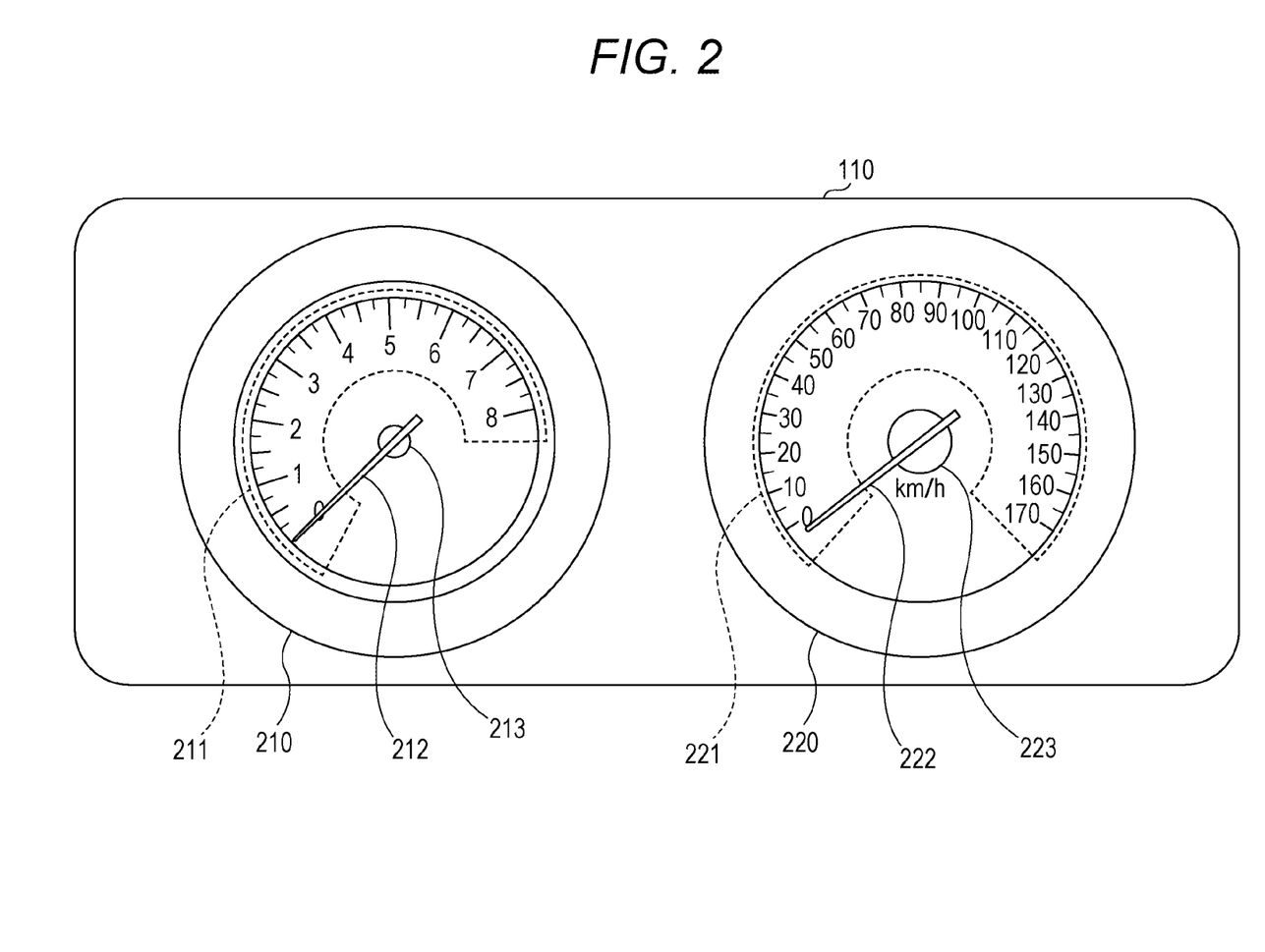
FIG. 2 is a diagram illustrating a display example of a display device.

A display example of the display device 110 will be described below. FIG. 2 is a diagram illustrating a display example of the display device. As illustrated in FIG. 2, image data which is displayed on the display device 110 includes a rotation speed data display area 210 and a speed data display area 220. In the display example illustrated in FIG. 2, a display area of data other than rotation speed data and speed data is not illustrated for the purpose of simplification of description.

The rotation speed data display area 210 includes gradations 211 indicating values of a rotation speed of an engine of the vehicle and a needle 212 indicating the current rotation speed of the engine. The needle 212 is a graphic element that rotates by an angle based on the rotation speed data around a rotation center 213. Similarly, the speed data display area 220 includes gradations 221 indicating values of a speed of the vehicle and a needle 222 indicating the current speed of the vehicle. The needle 222 is a graphic element that rotates by an angle based on the speed data around a rotation center 223.

<Hardware Configuration of Display Control Device>

Figure 3:
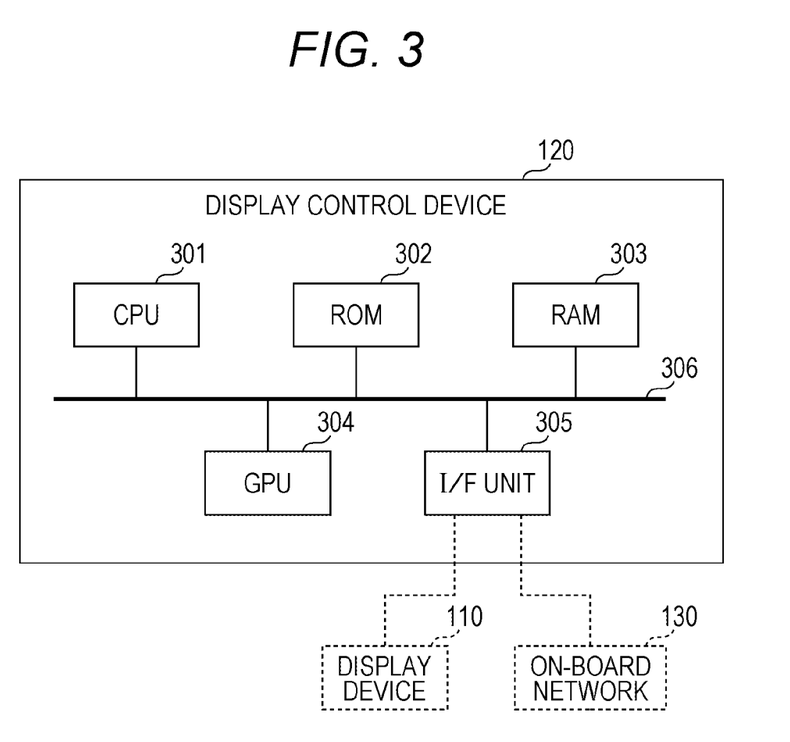
FIG. 3 is a diagram illustrating an example of a hardware configuration of a display control device.

A hardware configuration of the display control device 120 will be described below. FIG. 3 is a diagram illustrating an example of a hardware configuration of a display control device. As illustrated in FIG. 3, the display control device 120 includes a central processing unit (CPU) 301, a read only memory (ROM) 302, and a random access memory (RAM) 303. The CPU 301, the ROM 302, and the RAM 303 constitute a computer. The display control device 120 further includes a graphic processing unit (GPU) 304 and an interface (I/F) unit 305. The units of the display control device 120 are connected to each other via a bus 306.

The CPU 301 is a device that executes various programs (for example, a display control program) which are installed in the ROM 302. The ROM 302 is a nonvolatile memory and serves as a main storage device. The RAM 303 is a volatile memory such as a dynamic random access memory (DRAM) or a static random access memory (SRAM). The RAM 303 serves as a main storage device that provides a work area which is loaded when various programs installed in the ROM 302 are executed by the CPU 301. A vehicle information storage unit which will be described later is embodied by the RAM 303. The GPU 304 is a dedicated integrated circuit that processes image data and generates, for example, image data which is displayed on the display device 110 in this embodiment. The I/F unit 305 is a connection device for connection to the display device 110 or the on-board network 130.

<Description of Processing Time of Display Control Device>

Processing times at which the display control device 120 performs various processes (an acquisition time of vehicle information, a generation time of image data, and a display time of image data) will be described below. In the following description, it is first assumed that a processing load of the display control device is low and the processing load does not vary.

Specifically, a case (Case 1) in which a display control device according to a comparative example generates image data in a situation in which image data can be generated on a constant cycle and a case (Case 2) in which the display control device 120 according to this embodiment generates image data in the same situation will be described in comparison with each other. It is assumed that the display control device according to the comparative example refers to a general display control device which is compared for making features of the display control device 120 according to this embodiment clear and is configured to generate image data using newest vehicle information.

Another case in which the processing load of the display control device varies also will be described below. Specifically, a case (Case 3) in which the display control device according to the comparative example generates image data in a situation in which a generation cycle of image data varies and a case (Case 4) in which the display control device 120 according to this embodiment generates image data in the same situation will be described in comparison with each other.

(1) Description of Processing Time in Case 1

Figure 4A:
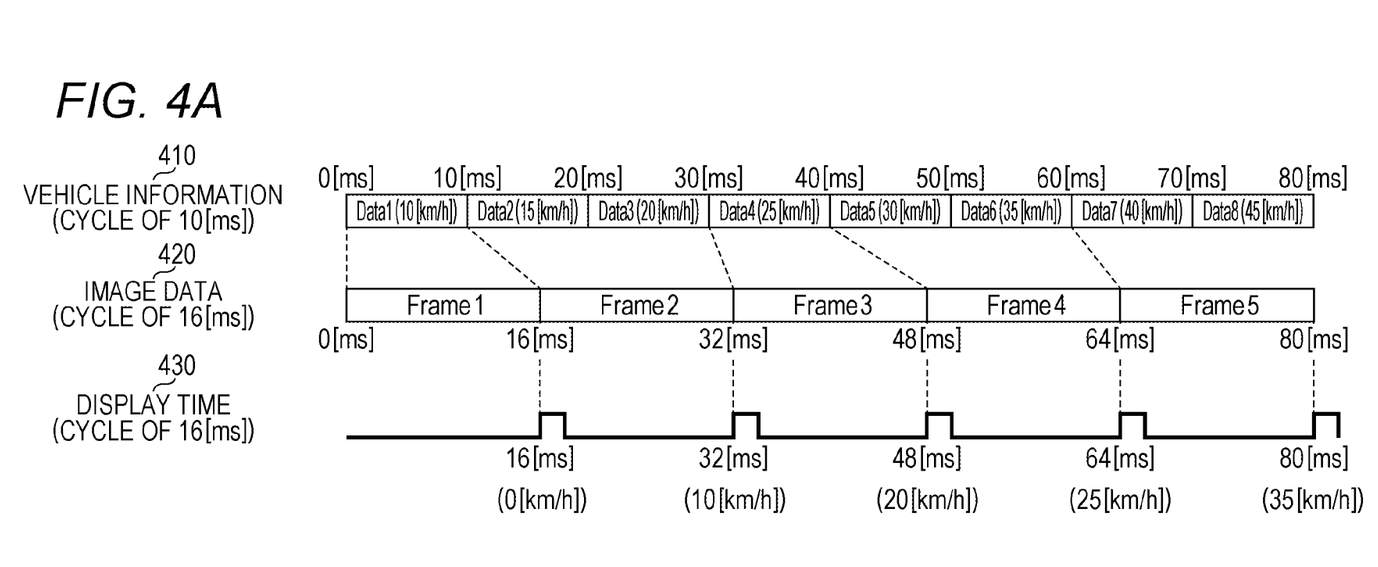
FIGS. 4A and 4B are first diagrams illustrating a relationship between an acquisition time of vehicle information, a generation time of image data, and a display time of generated image data.

FIGS. 4A and 4B are first diagrams illustrating a relationship between an acquisition time of vehicle information, a generation time of image data, and a display time of generated image data. In FIG. 4A, vehicle information 410 indicates a time at which the display control device according to the comparative example acquires vehicle information from the on-board network. Image data 420 indicates a time at which the display control device according to the comparative example generates image data. A display time 430 indicates a time at which the display control device according to the comparative example displays image data on the display device (in which the display time is synchronized with the generation time for the purpose of convenience of description in the example illustrated in FIG. 4A).

As illustrated in FIG. 4A, the display control device according to the comparative example acquires vehicle information "Data1" from the on-board network between times 0 [msec] and 10 [msec]. Hereinafter, it is assumed that the display control device according to the comparative example acquires "Data2," "Data3," etc. every 10 [msec]. As illustrated in FIG. 4A, the display control device according to the comparative example generates image data "Frame1" between times 0 [msec] and 16 [msec]. Hereinafter, it is assumed that the display control device according to the comparative example generates "Frame2," "Frame3," etc. every 16 [msec].

The display control device according to the comparative example generates image data using newest vehicle information which is acquired at a time point at which generation of the image data is started. For example, the display control device according to the comparative example generates the image data "Frame2" using the vehicle information "Data1" and generates the image data "Frame3" using the vehicle information "Data3." The display control device according to the comparative example generates the image data "Frame4" and "Frame5" using the vehicle information "Data4" and "Data6," respectively.

As illustrated in FIG. 4A, the display control device according to the comparative example displays the image data "Frame1" at a time 16 [msec]. Thereafter, the display control device according to the comparative example displays the image data "Frame2," "Frame3," etc. on the display device every 16 [msec]. Accordingly, on the display device, the vehicle information "Data1" is displayed at a time 32 [msec] and the vehicle information "Data3" is displayed at a time 48 [msec]. On the display device, the vehicle information "Data4" is displayed at a time 64 [msec] and the vehicle information "Data6" is displayed at a time 80 [msec].

Figure 4B:
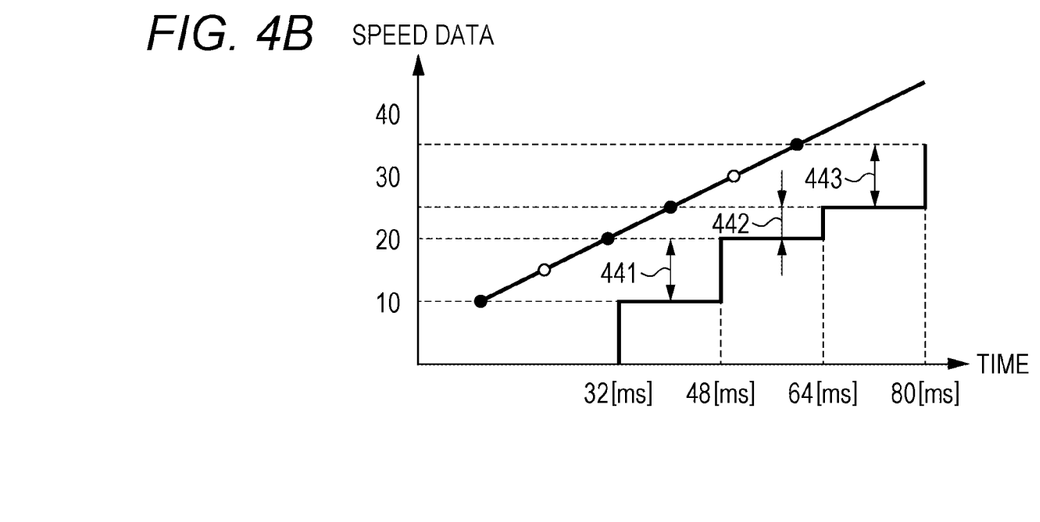

Here, it is assumed that Data1=10 [km/h], Data2=15 [km/h], Data3=20 [km/h], Data4=25 [km/h], Data5=30 [km/h], Data6=35 [km/h], and Data7=40 [km/h]. That is, as illustrated in FIG. 4B, it is assumed that the speed data increases at a constant rate (the horizontal axis in FIG. 4B represents time and the vertical axis represents speed data). In this case, the display control device according to the comparative example displays "10" [km/h] at a time 32 [msec] and displays "20" [km/h] at a time 48 [msec]. The display control device according to the comparative example displays "25" [km/h] at a time 64 [msec] and displays "35" [km/h] at a time 80 [msec].

In this case, in the display control device according to the comparative example, a degree of motion of the needle of the speed meter is not constant in spite of a constant change of speed data when the display cycle of image data is longer than the acquisition cycle of vehicle information (see arrows 441 to 443 in FIG. 4B). That is, a phenomenon occurs that a motion of a needle fluctuates.

(2) Description of Processing Time in Case 2

Figure 5A:
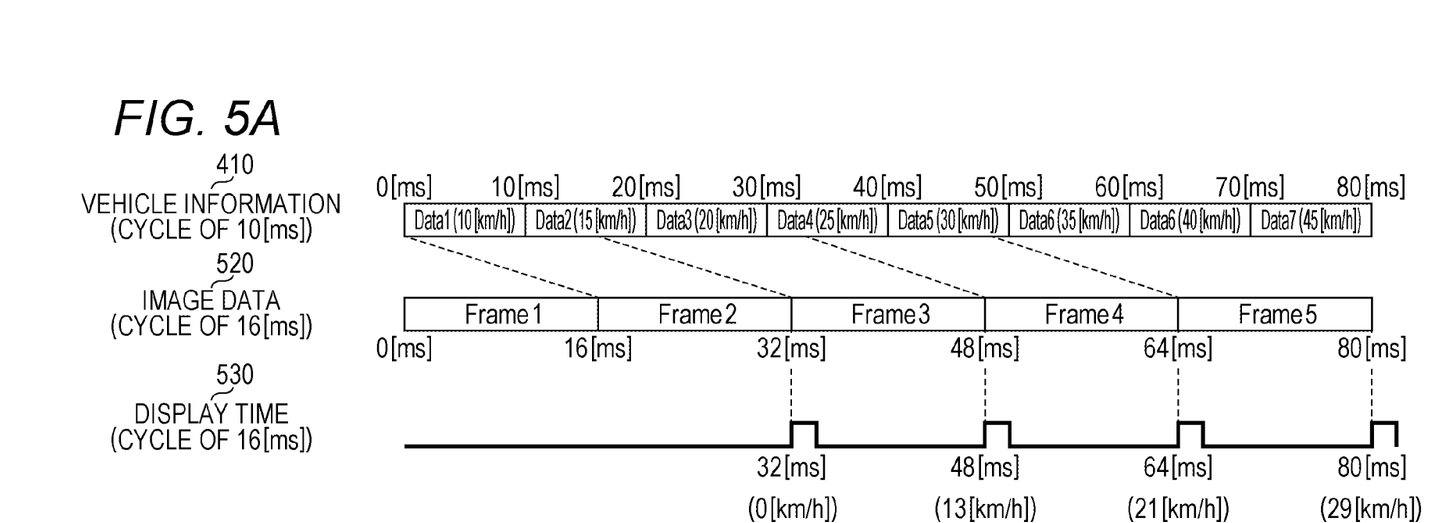
FIGS. 5A and 5B are second diagrams illustrating a relationship between an acquisition time of vehicle information, a generation time of image data, and a display time of generated image data.

FIGS. 5A and 5B are second diagrams illustrating a relationship between the acquisition time of vehicle information, the generation time of image data, and the display time of generated image data. In FIG. 5A, vehicle information 410 indicates a time at which the display control device 120 according to this embodiment acquires vehicle information from the on-board network 130. Image data 520 indicates a time at which the display control device 120 according to this embodiment generates image data. A display time 530 indicates a time at which the display control device 120 according to this embodiment displays image data on the display device 110.

As illustrated in FIG. 5A, the display control device 120 according to this embodiment acquires vehicle information "Data1" from the on-board network 130 between times 0 [msec] and 10 [msec]. Hereinafter, it is assumed that the display control device 120 according to this embodiment acquires "Data2," "Data3," etc. from the on-board network 130 every 10 [msec].

As illustrated in FIG. 5A, the display control device 120 according to this embodiment generates the image data ("Frame2") between times 16 [msec] and 32 [msec]. The display control device 120 generates the image data ("Frame2") by calculating the vehicle information corresponding to the generation start time ("0" [msec]) of the previously generated image data ("Frame1") using the vehicle information acquired before and after the time. Similarly, the display control device 120 generates the image data ("Frame3") between times 32 [msec] and 48 [msec]. The display control device 120 generates the image data ("Frame3") by calculating the vehicle information corresponding to the generation start time ("16" [msec]) of the previously generated image data ("Frame2") using the vehicle information acquired before and after the time.

Thereafter, the display control device 120 generates the current image data by calculating the vehicle information corresponding to the generation start time of the previously generated image data using the vehicle information acquired before and after the time.

For example, the display control device 120 identifies the time 16 [msec] as the generation start time of the previously generated image data ("Frame2") in generating the image data "Frame3." The display control device 120 calculates the vehicle information corresponding to the time 16 [msec]. Here, at the generation start time point (the time 32 [msec]) of the image data "Frame3," the display control device 120 already acquires the vehicle information "Data1" at the time 10 [msec] and the vehicle information "Data2" at the time 20 [msec]. Accordingly, the vehicle information corresponding to the generation start time (the time 16 [msec]) of the previously generated image data ("Frame2") can be calculated by Data1+(Data2−Data1)×(16−10)/(20−10). That is, the display control device 120 calculates the vehicle information which is used to generate the current image data ("Frame3") by performing linear interpolation on the basis of two pieces of vehicle information ("Data1" and "Data2") which have been acquired.

As illustrated in FIG. 5A, the display control device 120 displays the image data "Frame2" at a time 32 [msec]. Thereafter, the display control device 120 displays the image data "Frame3," "Frame4," etc. on the display device 110 every 16 [msec], respectively. Accordingly, the vehicle information ("Frame3") which is calculated on the basis of the vehicle information "Data1" and "Data2" is displayed on the display device 110 at the time 48 [msec]. At the time 64 [msec], the vehicle information ("Frame4") which is calculated on the basis of the vehicle information "Data3" and "Data4" is displayed.

Figure 5B:
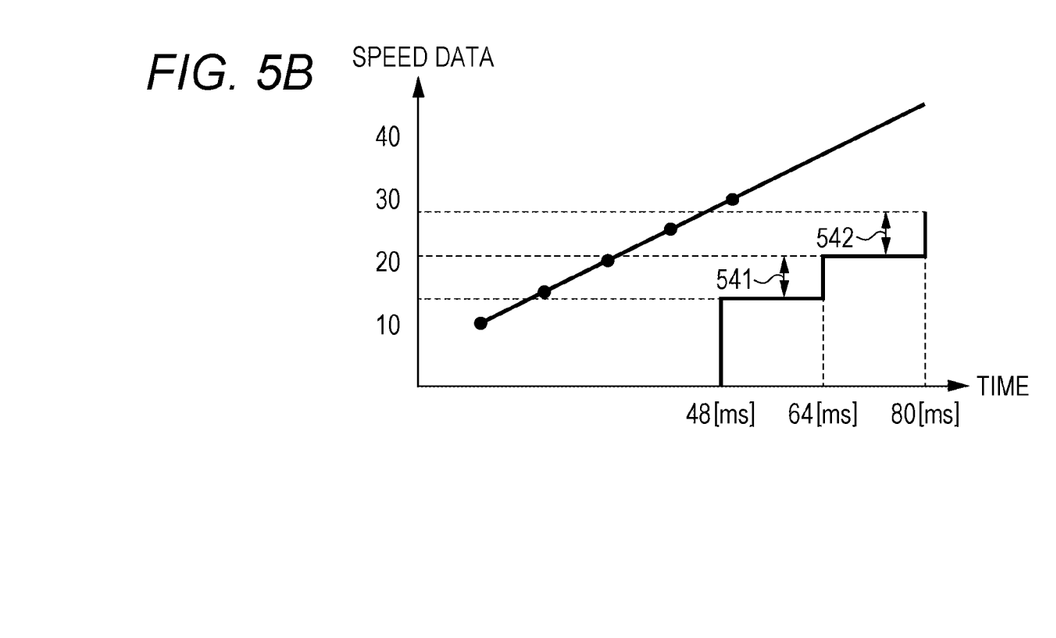

Here, it is assumed that Data1=10 [km/h], Data2=15 [km/h], Data3=20 [km/h], Data4=25 [km/h], Data5=30 [km/h], Data6=35 [km/h], and Data7=40 [km/h]. That is, as illustrated in FIG. 5B, it is assumed that the speed data increases at a constant rate (the horizontal axis in FIG. 5B represents time and the vertical axis represents speed data). In this case, the display control device 120 displays "13" [km/h] at the time 48 [msec], displays "21" [km/h] at the time 64 [msec], and displays "29" [km/h] at the time 80 [msec].

In this way, the display control device 120 uses the vehicle information corresponding to the generation start time of the N-th generated image data (where N is an integer equal to or greater than 1) instead of using the newest vehicle information at the generation start time of the image data. The display control device 120 calculates and generates the (N+1)-th image data by linearly interpolating the vehicle information corresponding to the generation start time of the N-th generated image data using the vehicle information which is acquired before and after the time.

Accordingly, in the display control device 120, a degree of motion of the needle of the speed meter can be made to be constant when the change of speed data is constant even though the display cycle of image data is longer than the acquisition cycle of vehicle information (see arrows 541 and 542 in FIG. 5B). That is, it is possible to reduce a phenomenon that a motion of a needle fluctuates.

(3) Description of Processing Time in Case 3

Figure 6A:
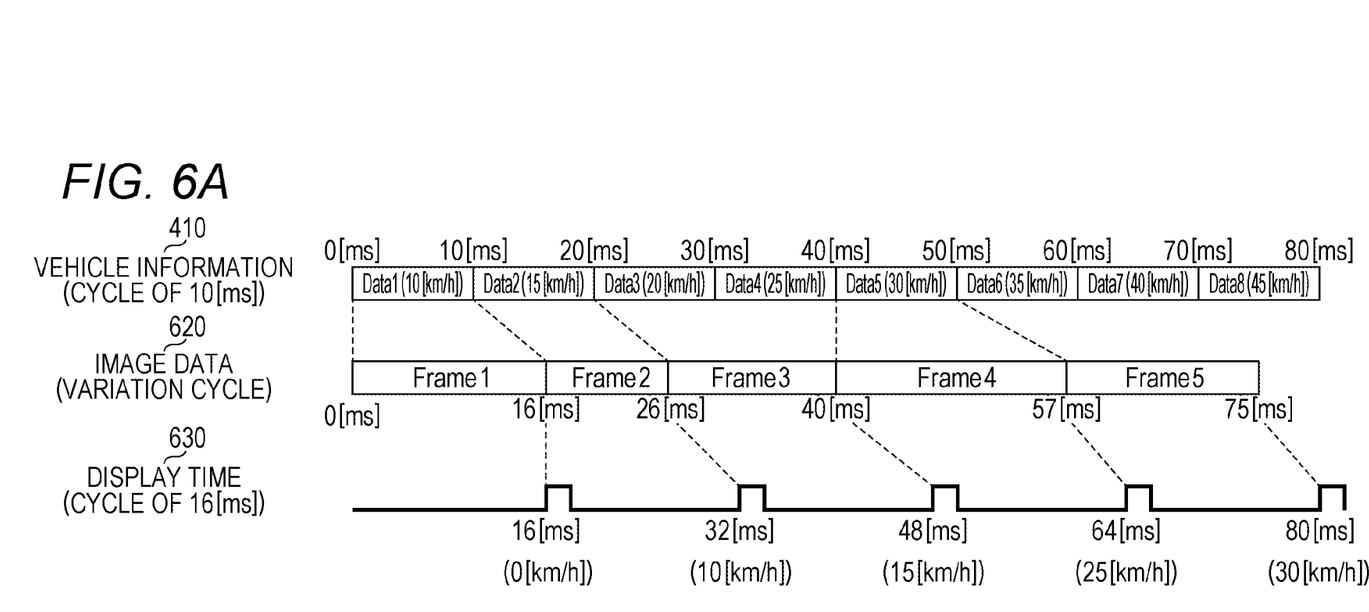
FIGS. 6A and 6B are third diagrams illustrating a relationship between an acquisition time of vehicle information, a generation time of image data, and a display time of generated image data.

FIGS. 6A and 6B are third diagrams illustrating a relationship between the acquisition time of vehicle information, the generation time of image data, and the display time of generated image data. In FIG. 6A, vehicle information 410 is the same as the vehicle information 410 in FIG. 4A, and image data 620 indicates a time at which the display control device according to the comparative example generates image data. A display time 630 indicates a time at which the display control device according to the comparative example displays image data on the display device.

In the case illustrated in FIG. 6A, since the processing load of the display control device according to the comparative example varies, the time required for generating image data is not constant and the generation cycle of image data varies. For example, at the time of generation of the image data "Frame1," the processing load of the display control device according to the comparative example is middle and thus the generation time is 16 [msec]. At the time of generation of the image data "Frame2" and "Frame3," the processing load of the display control device according to the comparative example decreases and thus the generation times thereof are 10 [msec] and 14 [msec], respectively. On the other hand, at the time of generation of the image data "Frame4" and "Frame5," the processing load of the display control device according to the comparative example increases and thus the generation times thereof are 17 [msec] and 18 [msec], respectively.

As described above, the display control device according to the comparative example generates image data using the newest vehicle information which is acquired at the generation start time of the image data. Accordingly, for example, the display control device according to the comparative example generates the image data "Frame2" using the vehicle information "Data1" and generates the image data "Frame3" using the vehicle information "Data2." The display control device according to the comparative example generates the image data "Frame4" using the vehicle information "Data4" and generates the image data "Frame5" using the vehicle information "Data5."

As illustrated in FIG. 6A, the display control device according to the comparative example displays the image data "Frame1" at a time 16 [msec]. Thereafter, the display control device according to the comparative example displays the image data "Frame2," "Frame3," etc. on the display device every 16 [msec]. Accordingly, on the display device, the vehicle information "Data1" is displayed at a time 32 [msec] and the vehicle information "Data2" is displayed at a time 48 [msec]. On the display device, the vehicle information "Data4" is displayed at a time 64 [msec] and the vehicle information "Data5" is displayed at a time 80 [msec].

Figure 6B:
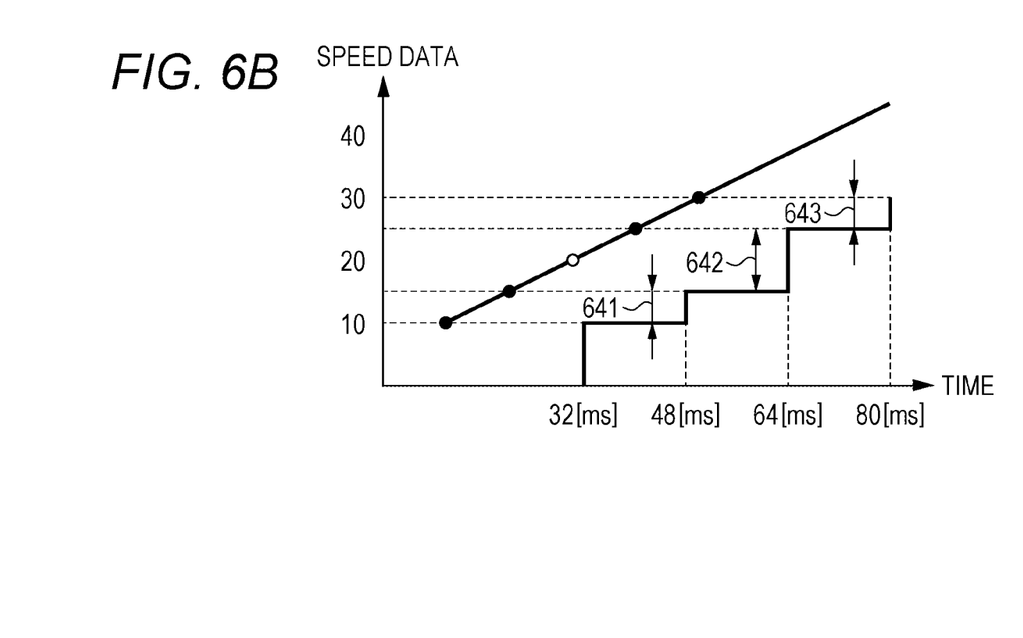

Here, it is assumed that Data1=10 [km/h], Data2=15 [km/h], Data3=20 [km/h], Data4=25 [km/h], Data5=30 [km/h], Data6=35 [km/h], and Data7=40 [km/h]. That is, as illustrated in FIG. 6B, it is assumed that the speed data increases at a constant rate (the horizontal axis in FIG. 6B represents time and the vertical axis represents speed data). In this case, the display control device according to the comparative example displays "10" [km/h] at the time 32 [msec] and displays "15" [km/h] at the time 48 [msec]. The display control device according to the comparative example displays "25" [km/h] at the time 64 [msec] and displays "30" [km/h] at the time 80 [msec].

In this case, in the display control device according to the comparative example, a degree of motion of the needle of the speed meter is not constant in spite of a constant change of speed data when the acquisition cycle of image data varies (see arrows 641 to 643 in FIG. 6B). That is, it is not possible to reduce the phenomenon that a motion of a needle fluctuates.

(4) Description of Processing Time in Case 4

Figure 7A:
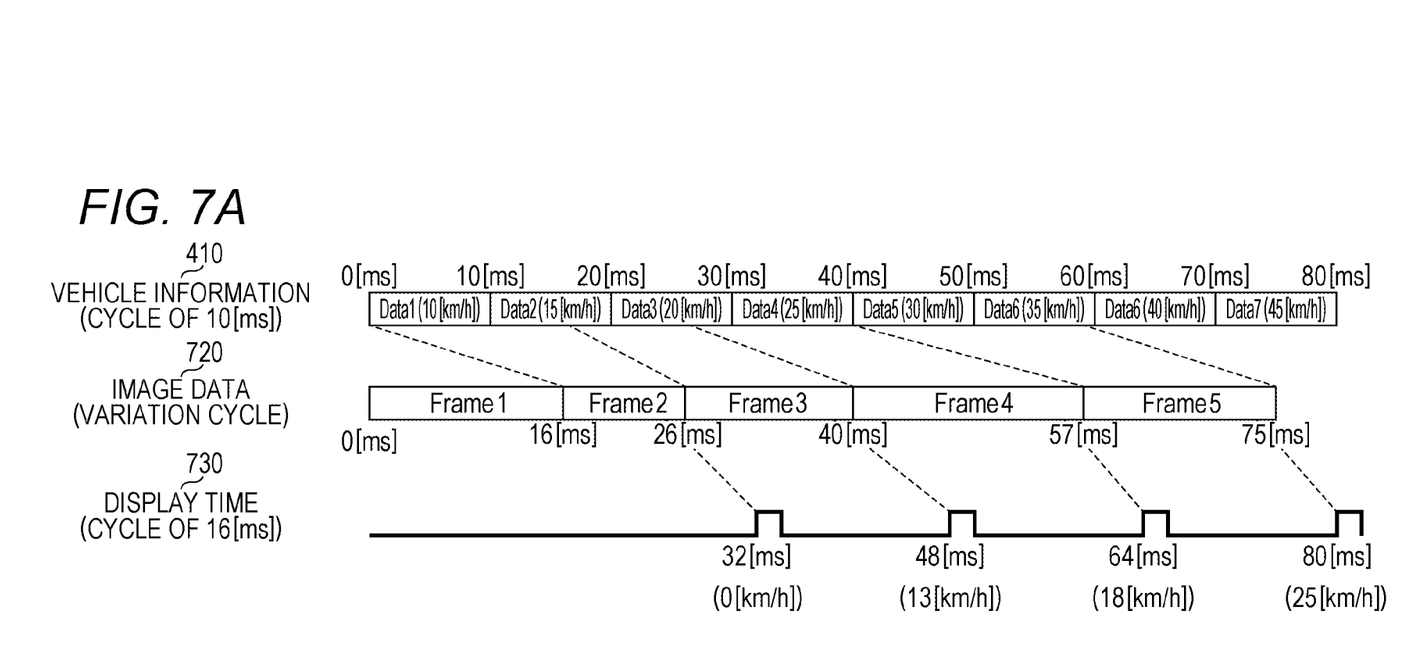
FIGS. 7A and 7B are fourth diagrams illustrating a relationship between an acquisition time of vehicle information, a generation time of image data, and a display time of generated image data.

FIGS. 7A and 7B are fourth diagrams illustrating a relationship between the acquisition time of vehicle information, the generation time of image data, and the display time of generated image data. In FIG. 7A, vehicle information 410 is the same as the vehicle information 410 in FIG. 5A, and image data 720 indicates a time at which the display control device 120 generates image data. A display time 730 indicates a time at which the display control device 120 displays image data on the display device 110.

In the case illustrated in FIG. 7A, since the processing load of the display control device 120 varies, the time required for generating image data is not constant and the generation cycle of image data varies. For example, at the time of generation of the image data "Frame1," the processing load of the display control device 120 is middle and thus the generation time is 16 [msec]. At the time of generation of the image data "Frame2" and "Frame3," the processing load of the display control device 120 decreases and thus the generation times thereof are 10 [msec] and 14 [msec], respectively. On the other hand, at the time of generation of the image data "Frame4" and "Frame5," the processing load of the display control device 120 increases and thus the generation times thereof are 17 [msec] and 18 [msec], respectively.

As described above, the display control device 120 uses the vehicle information corresponding to the generation start time of the previously generated image data instead of using the newest vehicle information which is acquired at the generation start time of the image data. The display control device 120 calculates the vehicle information corresponding to the generation start time of the previously generated image data by linear interpolation using the vehicle information which is acquired before and after the time.

Accordingly, for example, the display control device 120 identifies the time 16 [msec] as the generation start time of the previously generated image data ("Frame2") in generating the image data "Frame3." The display control device 120 calculates the vehicle information corresponding to the time 16 [msec]. Here, at the generation start time point (the time 26 [msec]) of the image data "Frame3," the display control device 120 already acquires the vehicle information "Data1" at the time 10 [msec] and the vehicle information "Data2" at the time 20 [msec]. Accordingly, the vehicle information corresponding to the generation start time (the time 16 [msec]) of the previously generated image data ("Frame2") can be calculated by Data1+(Data2−Data1)× (16−10)/(20−10). That is, the display control device 120 calculates the vehicle information which is used to generate the current image data ("Frame3") by performing linear interpolation on the basis of two pieces of vehicle information ("Data1" and "Data2") which have been acquired.

As illustrated in FIG. 7A, the display control device 120 displays the image data "Frame2" at a time 32 [msec]. Thereafter, the display control device 120 displays the image data "Frame3," "Frame4," etc. on the display device 110 every 16 [msec], respectively. Accordingly, the vehicle information ("Frame3") which is calculated on the basis of the vehicle information "Data1" and "Data2" is displayed on the display device 110 at the time 48 [msec]. At the time 64 [msec], the vehicle information ("Frame4") which is calculated on the basis of the vehicle information "Data2" and "Data3" is displayed.

Figure 7B:
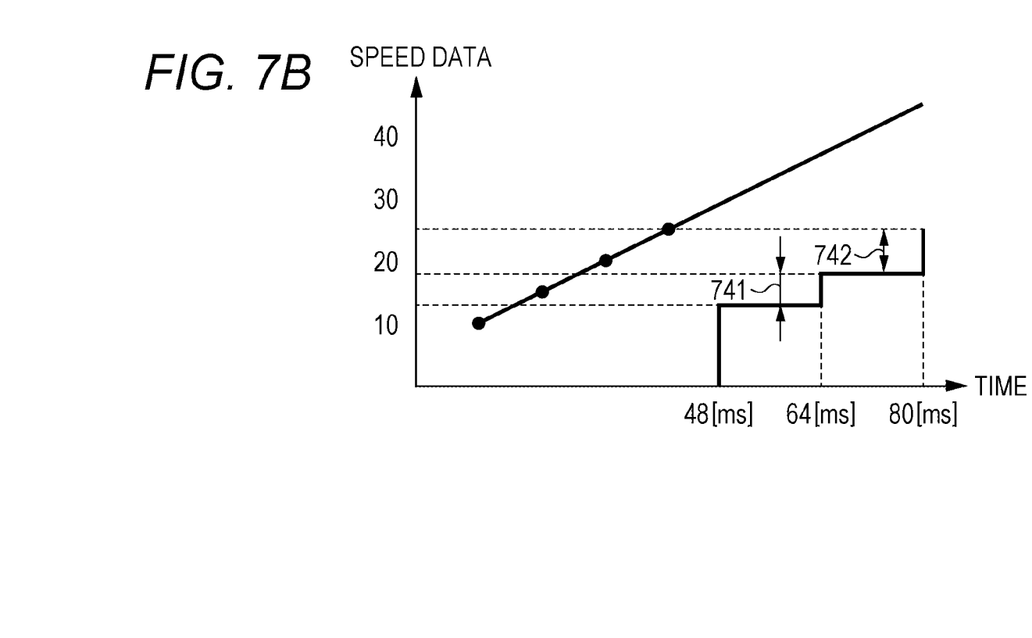

Here, it is assumed that Data1=10 [km/h], Data2=15 [km/h], Data3=20 [km/h], Data4=25 [km/h], Data5=30 [km/h], Data6=35 [km/h], and Data7=40 [km/h]. That is, as illustrated in FIG. 7B, it is assumed that the speed data increases at a constant rate (the horizontal axis in FIG. 7B represents time and the vertical axis represents speed data). In this case, the display control device 120 displays "13" [km/h] at the time 48 [msec], displays "18" [km/h] at the time 64 [msec], and displays "25" [km/h] at the time 80 [msec].

In this way, in the display control device 120, a change of a degree of motion of the needle of the speed meter can be reduced when the change of speed data is constant even though the generation cycle of image data varies (see arrows 741 and 742 in FIG. 7B). That is, it is possible to reduce a phenomenon that a motion of a needle fluctuates.

<Functional Configuration of Display Control Device>

Figure 8:
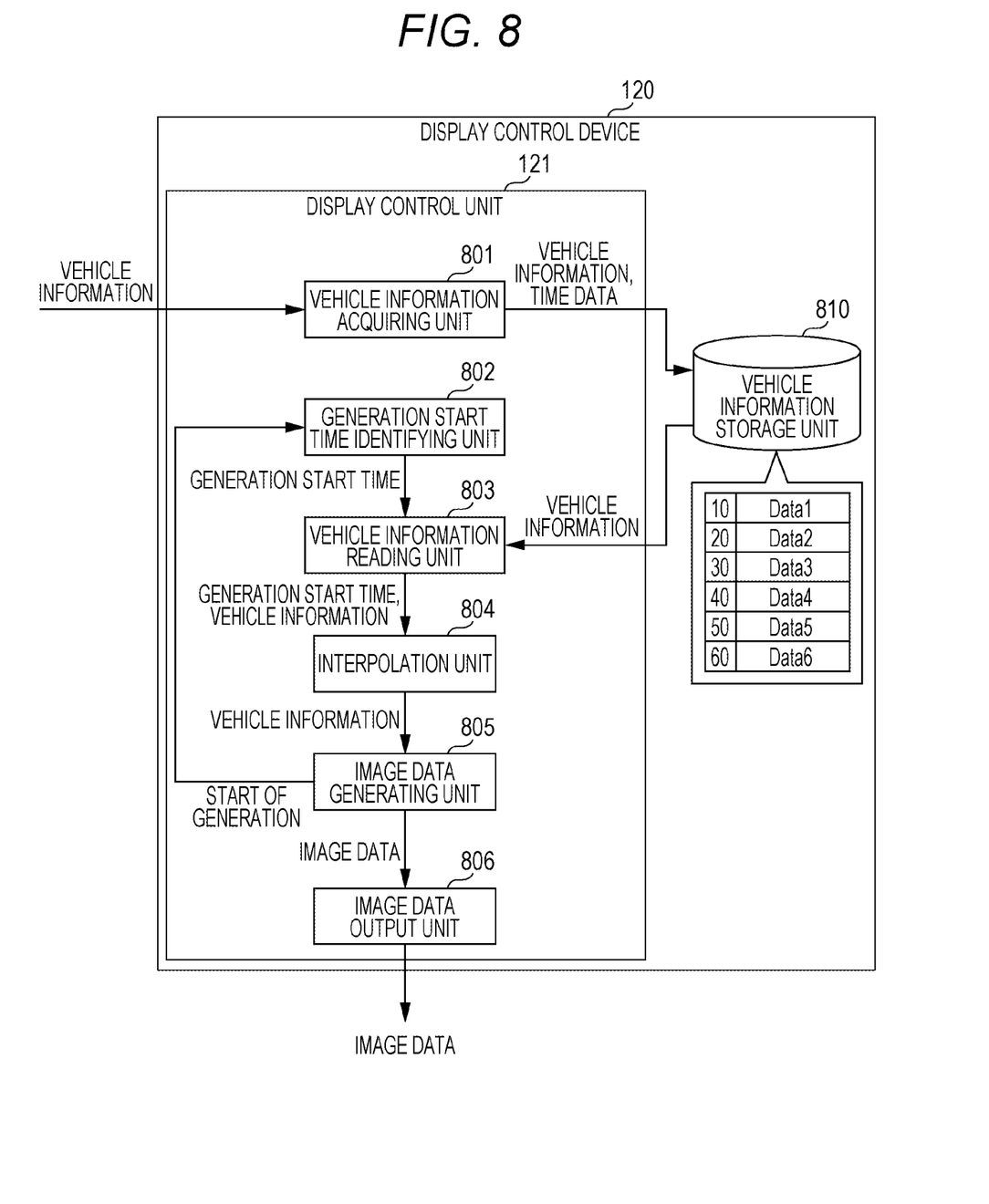
FIG. 8 is a diagram illustrating details of a functional configuration of a display control unit.

The functional configuration of the display control unit 121 of the display control device 120 will be described below. FIG. 8 is a diagram illustrating details of the functional configuration of the display control unit. As illustrated in FIG. 8, the display control unit 121 includes a vehicle information acquiring unit 801, a generation start time identifying unit 802, a vehicle information reading unit 803, an interpolation unit 804, an image data generating unit 805, and an image data output unit 806.

The vehicle information acquiring unit 801 acquires vehicle information from the on-board network 130 on a predetermined acquisition cycle (a first cycle, for example, 10 [msec]) and stores the acquired vehicle information in a vehicle information storage unit 810, which is an example of a storage unit, in correlation with time data indicating the acquisition time (time information). FIG. 8 illustrates an example in which Data1 to Data6 are stored in the vehicle information storage unit 810 in correlation with the time data.

The generation start time identifying unit 802 identifies the generation start time of previously generated image data. When the image data generating unit 805 starts previous generation of image data and notification of the generation start is received from the image data generating unit 805, the generation start time identifying unit 802 identifies a time at which the notification of generation start is received as the generation start time. The generation start time identifying unit 802 provides the identified generation start time to the vehicle information reading unit 803.

The vehicle information reading unit 803 reads vehicle information (vehicle information acquired at times before and after the generation start time) for calculating vehicle information corresponding to the generation start time provided from the generation start time identifying unit 802 from the vehicle information storage unit 810. The vehicle information reading unit 803 notifies the interpolation unit 804 of the generation start time provided from the generation start time identifying unit 802 and the vehicle information read from the vehicle information storage unit 810.

The interpolation unit 804 calculates vehicle information corresponding to the generation start time on the basis of the generation start time and the vehicle information which are provided from the vehicle information reading unit 803. The interpolation unit 804 calculates the vehicle information corresponding to the generation start time by performing linear interpolation using the vehicle information provided from the vehicle information reading unit 803.

The image data generating unit 805 is an example of a generation unit and generates image data which is displayed on the display device 110 using the vehicle information corresponding to the generation start time. The image data generating unit 805 notifies the generation start time identifying unit 802 that generation of image data is started at the time of generation of the image data. The image data generating unit 805 notifies the image data output unit 806 of the generated image data.

The image data output unit 806 is an example of a control unit and outputs the image data notified from the image data generating unit 805 to the display device 110 on a predetermined display cycle (a second cycle, for example, a cycle 16 [msec] which is longer than the acquisition cycle).

<Flow of Display Control Process in Display Control Unit>

Figure 9:
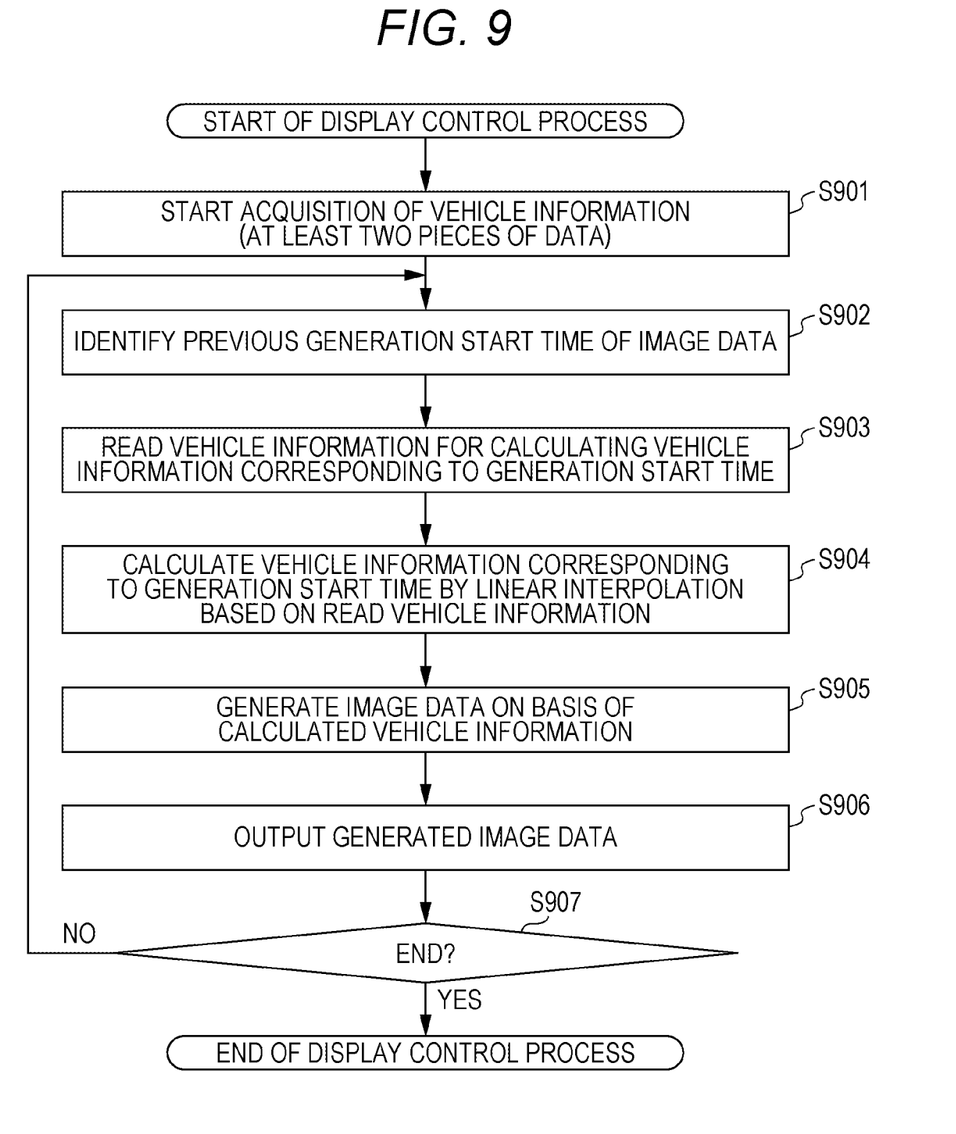
FIG. 9 is a flowchart illustrating a display control process.

A flow of a display control process which is performed by the display control unit 121 will be described below. FIG. 9 is a flowchart illustrating the display control process. When the display control device 120 starts, the display control process illustrated in FIG. 9 is started.

In Step S901, the vehicle information acquiring unit 801 starts acquisition of vehicle information from the on-board network 130. The vehicle information acquiring unit 801 acquires vehicle information corresponding to at least two pieces of data at the time of starting the display control device 120 and then performs Step S902.

In Step S902, the generation start time identifying unit 802 identifies the generation start time of previously generated image data and notifies the vehicle information reading unit 803 of the generation start time.

In Step S903, the vehicle information reading unit 803 reads vehicle information from the vehicle information storage unit 810 for calculating vehicle information corresponding to the generation start time.

In Step S904, the interpolation unit 804 performs linear interpolation based on the read vehicle information and calculates the vehicle information corresponding to the generation start time of the previously generated image data.

In Step S905, the image data generating unit 805 generates image data on the basis of the calculated vehicle information and notifies the image data output unit 806 of the generated image data.

In Step S906, the image data output unit 806 outputs the generated image data to the display device 110. The image data output unit 806 outputs the newest image data to the display device 110 on a predetermined display cycle (for example, a cycle of 16 [msec]).

In Step S907, the vehicle information acquiring unit 801 determines whether to end the display control process. When it is determined in Step S907 that the display control process should not be ended, the flow returns to Step S902. On the other hand, when it is determined in Step S907 that the display control process should be ended, the display control process is ended.

<Effects of Display Control Process>

Figure 10:
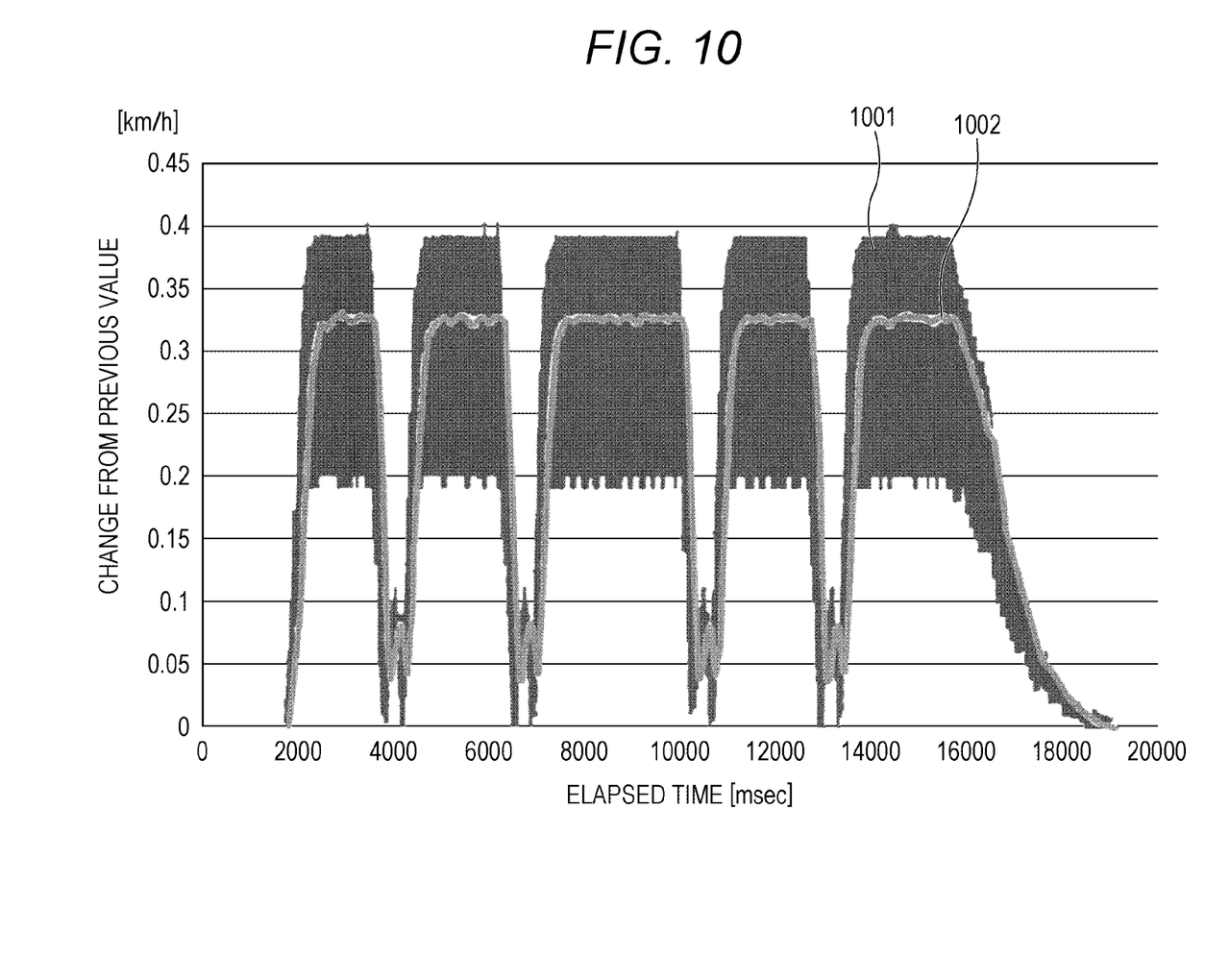
FIG. 10 is a diagram illustrating an effect of the display control process in the display control device.

Effects when the display control process (FIG. 9) is performed by the display control device 120 will be described below. FIG. 10 is a diagram illustrating effects of the display control process. In FIG. 10, the horizontal axis represents elapsed time ([msec]) and the vertical axis represents a change of vehicle information indicated by the needle in image data which is displayed at a predetermined display time from the vehicle information at the previous display time.

In FIG. 10, a graph 1001 indicates a change in the display control device according to a comparative example and a graph 1002 indicates a change in the display control device 120 according to this embodiment. During measurement, the processing load of any display control device varies, but the display control device according to the comparative example is likely to be affected by the display cycle being longer than the acquisition cycle or by a varying processing load, and a change of the needle is larger as illustrated in FIG. 10. On the other hand, the display control device 120 according to this embodiment is not likely to be affected by the display cycle being longer than the acquisition cycle or by a varying processing load, and a change of the needle is small. That is, with the display control device 120 according to this embodiment, the phenomenon that a motion of a needle fluctuates can be further reduced than with the display control device according to the comparative example.

In the display control device 120 according to this embodiment, the vehicle information displayed at the current time is vehicle information at the generation start time of the previously generated image data. Accordingly, in the display control device 120 according to this embodiment, the newest vehicle information is displayed with a delay of one cycle as a display cycle (for example, 16 [msec]). On the other hand, in general, an average visual reaction time of human beings is said to be 180 to 200 [msec], and a delay of one cycle (for example, 16 [msec]) is not a level that is uncomfortable to a person. Accordingly, even when the above-mentioned display control process is performed, a person does not have an uncomfortable feeling.

CONCLUSION

As can be clearly seen from the above description, the display control device 120 according to this embodiment:
acquires vehicle information and stores the acquired vehicle information in the vehicle information storage unit in correlation with time data indicating the acquisition time;
reads vehicle information for calculating vehicle information corresponding to the generation start time of the N-th generated image data from the vehicle information storage unit;
calculates vehicle information corresponding to the generation start time of the N-th generated image data by linearly interpolating the read vehicle information; and
generates image data on the basis of the calculated vehicle information and displays the generated image data as (N+1)-th image data.

Accordingly, in the display control device 120 according to this embodiment, it is possible to provide a constant degree of motion of the needle when the change of the vehicle information is constant. That is, with the display control device 120 according to this embodiment, it is possible to reduce the phenomenon that the motion of the needle fluctuates, to realize a smooth motion in graphic display of vehicle information.

[Second Embodiment]

In the first embodiment, the vehicle information corresponding to the generation start time of the previously (N-th) generated image is calculated. However, the method of calculating vehicle information is not limited thereto, but, for example, vehicle information corresponding to the generation start time of the ((N−1)-th) generated image data two times before may be calculated. At any rate, the vehicle information before and after vehicle information to be calculated has only to be already acquired at a time point at which generation of image data is started. This is because the vehicle information to be calculated can be calculated by linear interpolation.

In the first embodiment, two pieces of vehicle information acquired at the times before and after are used to calculate the vehicle information corresponding to the generation start time of the previously generated image data. However, the number of pieces of vehicle information to be used is not limited to two, but three or more pieces of vehicle information may be used to calculate the vehicle information. The vehicle information acquired at the times before and after is not limited to vehicle information acquired at the times immediately before and immediately after.

In the first embodiment, a detailed structure of the vehicle information storage unit 810 is not particularly mentioned, but the vehicle information storage unit 810 may be configured to use, for example, a queue with a FIFO (First In, First Out) structure.

In the first embodiment, the vehicle information is vehicle speed data, but the same is true of a case in which the vehicle information is rotation speed data.

In the first embodiment, image data is generated on the basis of vehicle information, but when the display system 100 is mounted in a moving object other than a vehicle, the image data may be generated on the basis of moving object information indicating a state of the moving object.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display control device that is connected to a display device, the display control device comprising:
a storage unit configured to store moving object information which is acquired on a first cycle in correlation with time information;
a generation unit configured to read the moving object information stored in the storage unit and to generate image data; and
a control unit configured to perform control such that the image data generated by the generation unit is displayed on a second cycle which is longer than the first cycle,
wherein the generation unit calculates the moving object information corresponding to a generation start time of the N-th generated image data on the basis of the moving object information which is stored in the storage unit at times before and after the generation start time and generates the (N+1)-th image data.

2. The display control device according to claim 1, wherein the generation unit calculates the moving object information corresponding to the generation start time by linearly interpolating the moving object information stored in the storage unit at times before and after the generation start time.

3. The display control device according to claim 1, wherein the generation unit generates the image data including a meter having a needle that rotates at an angle based on the moving object information corresponding to the generation start time.

4. A display system comprising a display control device and a display device,
wherein the display control device includes:
a storage unit configured to store moving object information which is acquired on a first cycle in correlation with time information;

a generation unit configured to read the moving object information stored in the storage unit and to generate image data; and a control unit configured to perform control such that the image data generated by the generation unit is displayed on a second cycle which is longer than the first cycle, and the generation unit calculates the moving object information corresponding to a generation start time of the N-th generated image data on the basis of the moving object information which is stored in the storage unit at times before and after the generation start time and generates the (N+1)-th image data.

5. A display control method of a display control device that is connected to a display device, the display control method comprising:

a storage step of storing moving object information which is acquired on a first cycle in correlation with time information;

a generation step of reading the moving object information stored in the storage step and generating image data; and a control step of performing control such that the image data generated in the generation step is displayed on a second cycle which is longer than the first cycle, wherein the generation step includes calculating the moving object information corresponding to a generation start time of the N-th generated image data on the basis of the moving object information which is stored in the storage step at times before and after the generation start time and generating the (N+1)-th image data.

6. The display control method according to claim 5, wherein the generating step calculates the moving object information corresponding to the generation start time by linearly interpolating the moving object information stored in the storage unit at times before and after the generation start time.

7. The display control method according to claim 5, wherein the generating step generates the image data including a meter having a needle that rotates at an angle based on the moving object information corresponding to the generation state time.

* * * * *

UNITED STATES PATENT AND TRADEMARK OFFICE
CERTIFICATE OF CORRECTION

PATENT NO. : 10,604,012 B2
APPLICATION NO. : 15/850437
DATED : March 31, 2020
INVENTOR(S) : Wararu Tamura It is certified that error appears in the above-identified patent and that said Letters Patent is hereby corrected as shown below:

In the Claims

In Column 14, Claim 7, Line 20, delete "state" and insert in its place --start--.

Signed and Sealed this
Twenty-third Day of June, 2020

Andrei Iancu
*Director of the United States Patent and Trademark Office*